United States

Istvan

[11] 3,790,701

[45] Feb. 5, 1974

[54] SYSTEM FOR RECORDING AND PLAYING BACK COLOR ENCODED HOLOGRAMS

[75] Inventor: Gorog Istvan, Princeton, N.J.

[73] Assignee: RCA Corporation, New York, N.Y.

[22] Filed: Nov. 28, 1969

[21] Appl. No.: 880,680

[52] U.S. Cl. .......... 178/5.4 CD, 178/5.2 R, 350/3.5
[51] Int. Cl. ............................................. H04n 9/02
[58] Field of Search ................ 178/5.2, 5.4; 350/3.5

[56] References Cited
UNITED STATES PATENTS

| | | | |
|---|---|---|---|
| 3,475,549 | 10/1969 | Goldmark et al. | 178/5.2 |
| 3,506,327 | 4/1970 | Leith et al. | 350/3.5 |
| 3,511,553 | 5/1970 | Gerritsen et al. | 350/3.5 |

*Primary Examiner*—Richard Murray
*Attorney, Agent, or Firm*—Eugene M. Whitacre; Paul J. Rasmussen; William H. Meagher

[57] ABSTRACT

A hologram record is made containing information representative of the color and brightness of a scene. A replica of the hologram is played back in a system including a laser imaging unit for producing brightness and color representative signals which may be applied to a display device for reproducing the scene in its original colors.

11 Claims, 6 Drawing Figures

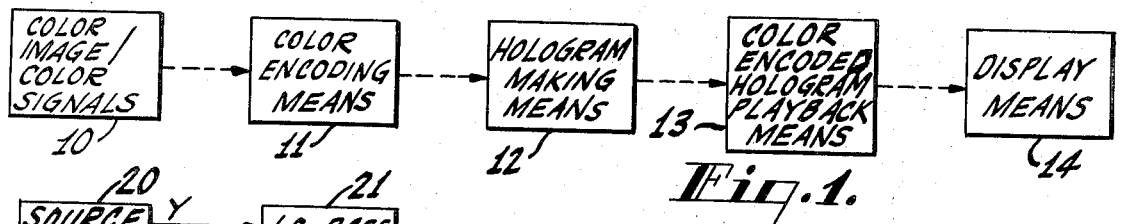
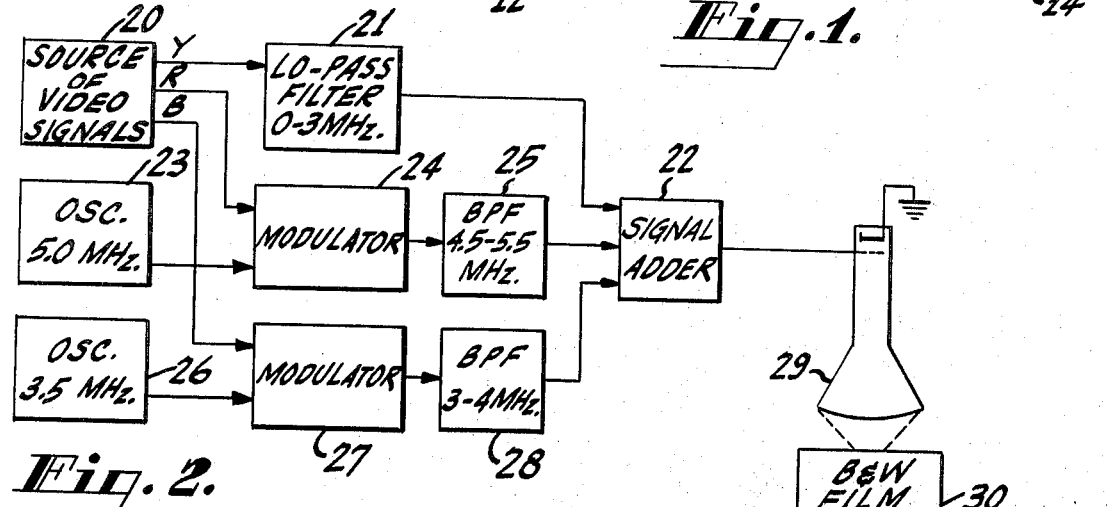
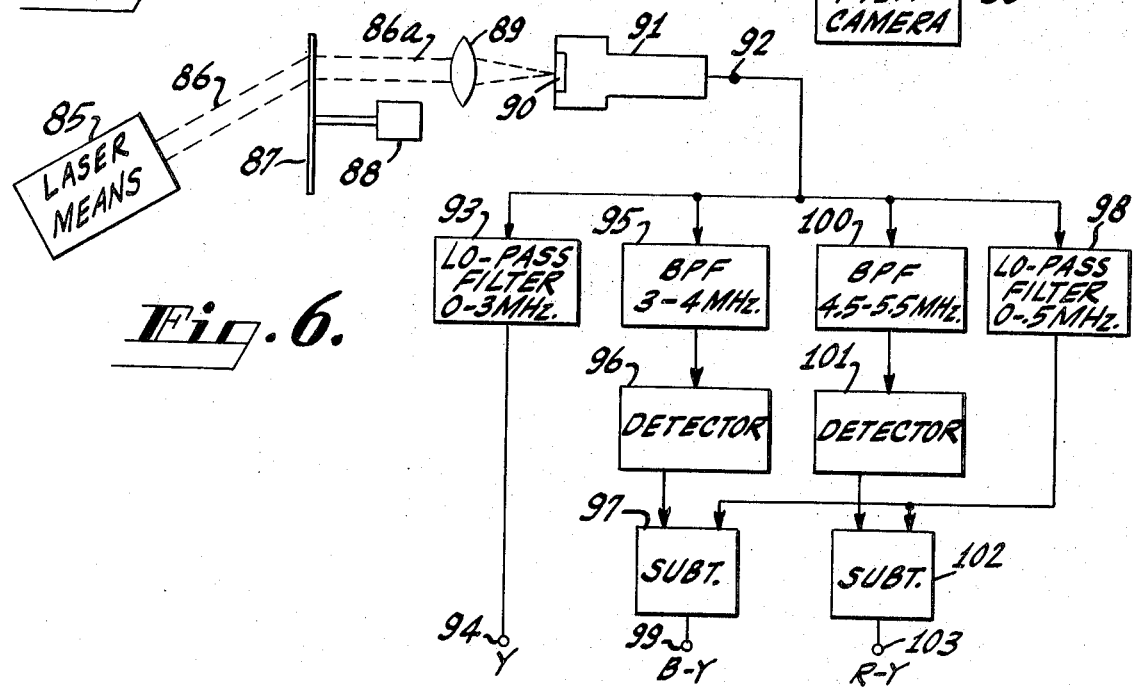
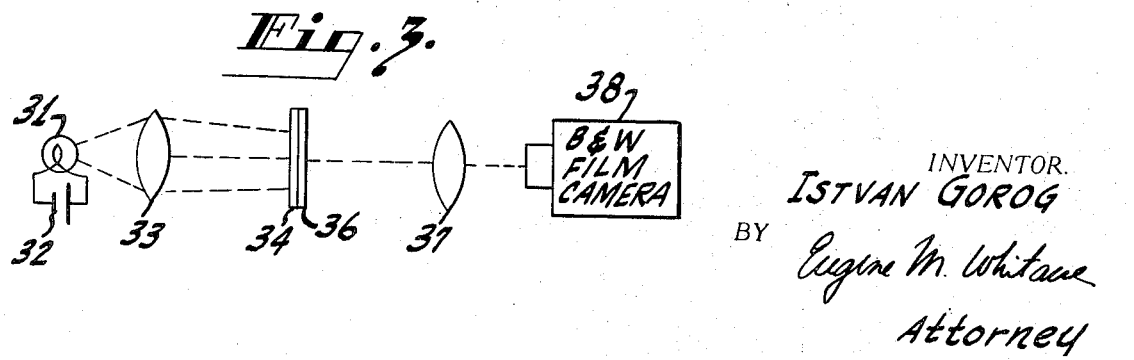

INVENTOR.
ISTVAN GOROG
BY Eugene M. Whitacre
Attorney

SYSTEM FOR RECORDING AND PLAYING BACK COLOR ENCODED HOLOGRAMS

BACKGROUND OF THE INVENTION

This invention relates to color encoded hologram records and apparatus for making and playing back the records.

The term "light," as used herein, includes electromagnetic radiation having a wavelength within the spectrum extending from infrared through visible to ultra violet. The term "monochromatic" light as used herein means light composed substantially of a single wavelength. "Spatially coherent" light, as used herein, means light emanating actually or apparently from a point source.

A hologram is a recording of all the information in a wave front of light obtained from an object which is illuminated with spatially coherent monochromatic light, rather than an image of the object obtained in ordinary photography. More specifically, as described in detail in the article, "Photography by Laser," by M. N. Leith and Juris Upatnicks, appearing on Page 24 of the June 1965 issue of Scientific American, a hologram consists of the recording of the interference fringes in a wave front covering a given area resulting from the interference between a first component of light obtained directly from a spatially coherent monochromatic originating light source, which first component is directed to the given area at a predetermined angle with respect thereto, and a second component of light obtained from the object to be recorded which is illuminated by light originating from the same light source simultaneously with the first component, the second component being directed at least in part to the given area at an angle other than the aforesaid predetermined angle.

These interference fringes result from the fact that the difference in path length, in wave lengths, and hence the difference in phase, between the first or reference component of spatially coherent monochromatic light and the second or information component of spatially coherent monochromatic light varies from point to point. Therefore, constructive interference between the two components takes place at certain points and destructive interference between the two components takes place at other points. Furthermore, the relative amplitude of the second or information component varies from point to point. This causes a variation in the contrast of the resulting interference fringes. In this manner, the recorded interference fringes form a pattern which defines both the amplitude and the phase of the second or information component as modulations in the contrast and spacing of the recorded interference fringes. This recorded pattern, which is called a hologram, contains all the information that can be carried by light waves transmitted through, reflected or scattered from an object.

A replica of the wave front which comprises the second or information component may be reconstructed by illuminating a hologram with a source of spatially coherent monochromatic light. In this case the hologram diffracts light impinging thereon to form two sets of first-order diffracted waves each of which is representative of the waves that issued from the original object. One of these two sets produces a virtual image of the original object, while the other of these two sets produces a real image of the object without the use of a lens. The virtual image is in all respects like the original object, and if the original object were three dimensional, the reconstructed virtual image shows depth and gives rise to parallax effects between near and far objects in the scene in the same manner as did the original object. The real image, however, is pseudoscopic, i. e., its curvature is reversed with respect to the original object, convex regions appearing to be concave, and vice versa.

Another property of a hologram is that the entire image is reproduced in response to the illumination of any portion of the hologram regardless of how small the size of this portion. However, as in the case of a pinhole camera, resolution is lost and the depth of focus becomes larger as this portion is made smaller, since these are functions of the aperture of the imaging system. The reason for this property of holograms is that each point on the hologram receives light from all parts of the original object and therefore contains, in an encoded form, the entire image.

Normally, a hologram is recorded on a silver emulsion photographic plate, the pattern of interference fringes thereof being manifested by variations in the opacity of the developed plate. However, it has been found that the thickness of the emulsion of a developed hologram plate is a linear function of opacity of the emulsion. Thus, the pattern of interference is also manifested by a relief pattern with respect to the ground of the emulsion surface which is made up of a plurality of profile contours the relative position and relative magnitude of which manifest the hologram information. Such a relief pattern may be employed, independently of any difference in opacity of the photographic plate, in the reconstruction of the hologram information.

More particularly, the silver in the emulsion may be bleached out, leaving a transparent photographic plate having the hologram information recorded thereon both in the form of the aforesaid relief pattern, and in the form of variation in refractive index corresponding spatially with the aforesaid relief pattern. Considering only the aforesaid relief pattern, since the index of refraction of such a transparent photographic plate is different from air, when a spatially coherent monochromatic beam of light shines through such a plate, light emerging from thicker portions of the plate will be phase delayed relative to light emerging from thinner portions of such a plate by an amount which is proportional to the difference in thickness therebetween. These phase delays, varying from point to point in accordance with the aforesaid hologram relief pattern, result in diffraction taking place which is identical to that obtained from a difference in opacity of the plate. Therefore, a reconstructed wave front will be formed.

Furthermore, rather than bleaching the silver from the emulsion, the emulsion may have a thin reflective metal film deposited thereon, which faithfully follows the contour of the relief pattern. In this case, a beam of spatially coherent monochromatic light reflected from the relief pattern appearing on the metalized surface of the plate causes a relative phase delay between light reflected from relatively "higher" and "lower" points of the relief pattern. This also results in a reconstructed wave front being formed by diffraction. A hologram which has its information manifested by a relief pattern of interference fringes or by variations in refractive index, rather than by a pattern of varying opacity, is called a phase hologram.

It will be seen that a phase hologram, in the first instant, need not necessarily be prepared from a silver emulsion photographic plate. Photo resist materials and techniques, well known in the art, may be alternatively employed in preparing a phase hologram. Also techniques for recording on thermoplastic materials may be employed for preparing a phase hologram. In fact, photo resist materials and thermoplastic materials have higher resolution capabilities than does a silver emulsion photographic plate.

As taught in a copending application Ser. No. 509,100 entitled Hologram Record Pressings filed on Nov. 22, 1965 by Hendrik J. Gerritsen and David F. Greenway, phase holograms may be utilized as master records, similar to master phonograph records, for mass producing duplicate hologram recordings or pressings in the same or a similar manner and employing the same or similar techniques as utilized by the prior art in mass producing duplicate phonograph records from master phonograph records. As disclosed by Gerritsen et al the master phase hologram recording may be made on any of several recording media, the essential requirements of the recording medium being that it is dimensionally stable and that it can be impressed with a relief pattern for forming the hologram record. Once the master hologram record in relief pattern form is produced it is then covered with a thin metal coating by means such as evaporation, after which the same techniques normally employed in making duplicate phonograph record pressings or replicas from a master phonograph record may be employed in making duplicate hologram record pressings or replicas from the master hologram recording in relief pattern form.

Gerritsen et al. disclose how the hologram master may be used to impress the relief pattern on clear vinyl which in one form, may be in disc form, the individual hologram relief patterns forming a spiral recording on the disc.

The apparatus described in the Gerritsen et al. application is useful in making hologram replicas of transparencies or motion picture film. The replicas are cheaper then conventional motion picture film replicas containing the same information.

Gerritsen et al describe a method of making a hologram replica containing color information. In order to convey red, green and blue information of a color scene contained in a single frame of color motion picture film or a single color transparency, Gerritsen et al record each color in a separate hologram on the disc replica. Thus, three holograms are required to record the color content of the color film frame or color transparency. Likewise, in the playback system described by Gerritsen et al. three image pickup tubes, such as utilized in television cameras, are utilized to pickup the separate red, green and blue information from the three separate holograms in order to provide simultaneous color representative signals which may be applied to a color television display tube for reproducing the original color scene.

An object of this invention is to provide a method of making a color encoded hologram recording containing full color information of a scene in a single frame.

Another object of this invention is to provide an improved system for making a color encoded hologram recording containing both color and brightness information of a scene.

Another object of this invention is to provide a color encoded hologram recording containing both color and brightness information of a scene.

Another object of this invention is to provide apparatus for producing color and brightness representative signals from a single frame of a color encoded hologram recording.

In accordance with the invention a method is provided for producing a color encoded hologram record by encoding brightness and color representative signals simultaneously onto black and white film and making a relief pattern of a hologram of the color encoded film on a record medium.

A system is provided for producing a color encoded hologram. Means are provided for combining signals contained within different frequency ranges representative of the color and brightness of a scene for forming a composite color and brightness representative signal. The composite signal is coupled to means for recording the composite signal on black and white film for making a color encoded film record of the color and brightness representative signals. The encoded film record is utilized in hologram record producing means for forming a hologram in a recording medium which hologram is representative of the color encoded film image.

In another embodiment of the invention a color transparency or motion picture film is encoded directly onto black and white film by optical color encoding filter means disposed between the illuminated color transparency or motion picture film and the black and white film. The developed black and white encoded film is then utilized in hologram record producing means for forming a hologram in a recording medium which hologram is representative of the color encoded film image.

In another embodiment of the invention color and brightness information is encoded directly onto the hologram. Color separation negatives made from a color transparency or color motion picture film and having superimposed grating patterns are disposed in the information beam path of a source of spatially coherent monochromatic light in the hologram producing apparatus whereby the color encoding and hologram forming is accomplished simultaneously.

A color encoded hologram record is provided containing in relief pattern form a color encoded hologram representative of the color and brightness of a scene.

A system is provided for playing back a replica of a color encoded hologram for producing color and brightness representative signals. Laser imaging means directs spatially coherent monochromatic light through a replica of a color encoded hologram. A reconstructed color encoded image is formed on the photosensitive element of an image pickup tube. Scanning of the image produces a composite signal representative of the color and brightness of the encoded scene contained in the hologram replica. The composite signal is applied to means for separating the color and brightness signals for producing separate color and brightness signals representative of the encoded scene and suitable for application to a display device for reproducing the encoded scene in its original color.

Several embodiments of the invention are described in more detail in the specification and accompanying drawings of which:

FIG. 1 is a general system block diagram of apparatus for producing and playing back color encoded holograms;

FIG. 2 is a diagram of apparatus for electronically encoding color and brightness representative signals onto black and white film;

FIG. 3 is a diagram of apparatus for optically encoding color and brightness representative signals onto black and white film;

FIG. 6 is a functional diagram of apparatus for producing color and brightness representative signals from color encoded hologram records.

DESCRIPTION OF THE INVENTION

Figure 4:
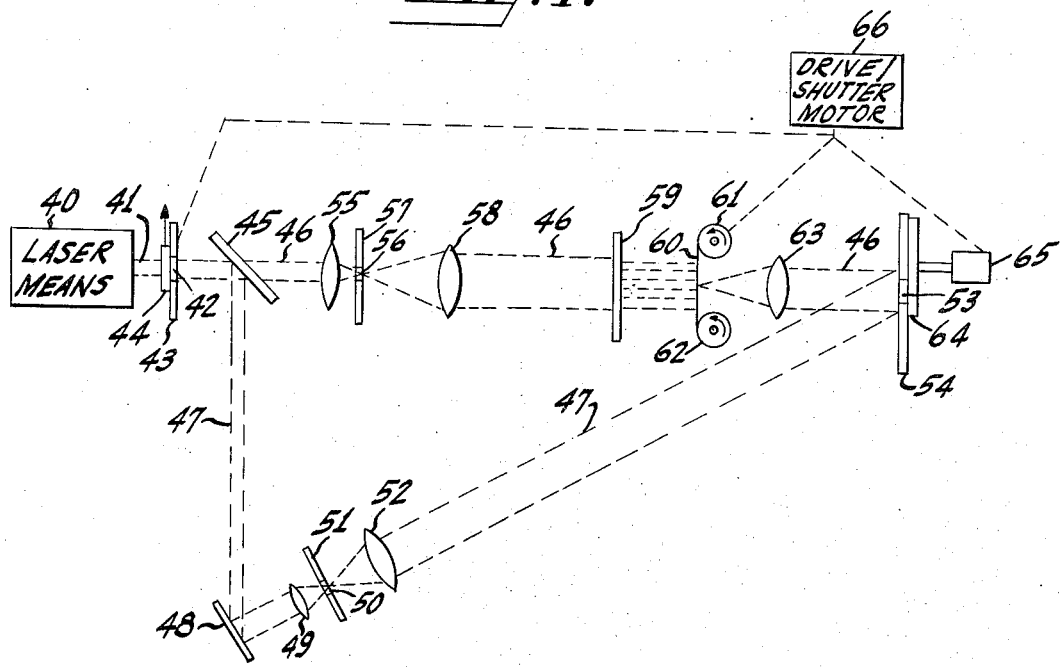
FIG. 4 is a functional diagram of apparatus for making hologram records of color encoded film.

FIG. 1 is a general system block diagram of apparatus for making and playing back color encoded holograms. A source 10 of color images or color signals is provided. Color images may be provided by illuminating color transparencies on color motion picture film. Electrical signals representative of the color and brightness components of a scene may be provided, for example, by any suitable color television camera or a tape machine providing color and brightness representative video signals. The color images or electrical color signals from source 10 are coupled to color encoding means 11. In the case in which color images are utilized, color encoding means 11 optically encodes the color images by means of color encoding filters. The encoded images may then be recorded on black and white film. When electrical color and brightness representative signals are utilized, color encoding means 11 electrically encodes the signals as modulation of carrier waves. The modulated carrier waves may then be recorded on black and white film. Examples of apparatus for optically and electronically encoding color information will be described subsequently.

The color encoded information, which may be on black and white film, is utilized in hologram making means 12 for forming a color encoded hologram on a recording medium. The recorded hologram is processed to yield a metal master recording which is then utilized to produce many inexpensive hologram replicas. A color encoded hologram replica is then played back in a color encoded hologram playback means 13 for producing electrical signals representative of the color and brightness of the color encoded scene. The electrical signals are coupled to a display means 14 which may be a color television picture tube, for example, for reproducing the encoded scene in its original colors.

FIG. 2 is a functional block diagram of apparatus for encoding brightness and color representative signals onto black and white film. A source of video signals 20 provides a brightness signal and R (red) and B (blue) color signals. Source 20, for example, may be a color television camera or a color videotape machine. The brightness or luminance signal obtained from source 20 is coupled to a low pass filter 21 which bandpass limits the luminance signal to 3 MHz. This bandpass limited luminance signal is coupled to an input terminal of signal adder 22.

The red color signal obtained from source 20 is coupled to an input terminal of modulator 24. An oscillator 23 provides a 5 MHz carrier wave which is coupled to another input terminal of modulator 24. The red color signal amplitude modulates the 5 MHz carrier wave for producing a red color modulated carrier wave and associated sidebands. The color signal obtained from modulator 24 is coupled to a bandpass filter 25 which bandpass limits the red color modulated carrier wave and its sidebands to a frequency range of 4.5 – 5.5 MHz. This band limited red color representative signal is coupled to an input terminal of signal adder 22.

The blue color signal obtained from source 20 is coupled to an input terminal of a modulator 27. An oscillator 26 provides a 3.5 MHz carrier wave which is coupled to another input terminal of modulator 27. The blue color signal amplitude modulates the 3.5 MHz carrier wave for producing a blue color modulated carrier wave and associated sidebands. The color signal obtained from modulator 27 is coupled to a bandpass filter 28 which bandpass limits the blue color modulated carrier wave and its sidebands to a frequency range of 3 to 4 MHz. This band limited blue color representative signal is coupled to another input terminal of signal adder 22. Signal adder 22 combines the luminance signal, the red color signal and the blue color signal to form a composite signal representative of the color and brightness of a scene.

This composite color and brightness signal is coupled to a control electrode of a cathode ray tube 29. The composite signal modulates an electron beam in cathode ray tube 29 such that the image of the composite signal is displayed on a phosphor screen of tube 29 as the electron beam scans a raster on the phosphor screen. A film camera 30 containing black and white film records each frame display of the phosphor screen for forming a color encoded black and white image on the film.

A system for encoding color and brightness signals on black and white film similar to the arrangement shown in FIG. 2 is described in U.S. Pat. No. 2,736,762 entitled Recording of Colored Images, granted to R. D. Kell on Feb. 28, 1956. The film encoded in the manner described above and in the Kell Patent is suitable for use in the system for making a hologram recording described in conjunction with FIG. 1.

FIG. 3 is a diagram showing apparatus for optically encoding color information onto black and white film. A light source 31 is energized by a battery 32. Light from source 31 is collimated by a collimating lens 33 and illuminates a color transparency 34. Transparency 34 may be a single color slide or a frame of a color motion picture film. It is to be understood that conventional apparatus is provided for advancing the color motion picture frames so that successive frames may be encoded. An optical color encoding filter assembly 36 is disposed adjacent color transparency 34 for spatially encoding the light passing therethrough. An imaging lens 37 focusses an image of the transparency and the color encoding filter onto a black and white film contained within a black and white film camera 38.

Color encoding filter assembly 36 may be any suitable assembly for encoding color information as modulation of a relatively high spatial frequency grating structure. An example of a suitable structure is described in U.S. Pat. No. 2,733,291 granted to Ray D. Kell on Jan. 31, 1956. Kell describes a first grating comprising alternate cyan and transparent stripes for encoding red light by the cyan stripes blocking red light and passing all other colors, and a second grating superimposed on the first comprising alternate yellow and transparent stripes for encoding blue light by the yellow stripes blocking blue light and passing all other colors. The line density of the stripes of the respective gratings is different, thereby spatially separating the red and blue encoded information. A brightness signal is contained in the average transmission of the superimposed gratings. Thus, the grating structure modulated by colored light is imaged on a photosensitive surface where the encoded image is stored as a monochromatic pattern. It is desirable to utilize superimposed encoding gratings in that full color and brightness information may be recorded on the black and white film within camera 38 by a single exposure, but a single transparency 34 may be illuminated several times utilizing separate encoding gratings for encoding different colors if it may be desirable to vary the exposure time or intensity for the different colors.

FIG. 4 shows in diagrammatic form apparatus for making a hologram recording of color encoded film whereby a single hologram contains both color and brightness information. A laser means 40 emits a beam of spatially coherent monochromatic light 41. In general, the source of spatially coherent monochromatic light need not necessarily be a laser, since initially non-spatially coherent monochromatic light, from a source such as a gas discharging lamp, can be made spatially coherent by passing it through a small pinhole. However, the intensity of a beam of light passed through a small pinhole is severely limited.

The beam of light 41 is passed through an aperture 42 of a mask 43 when shutter 44 is moved away from aperture 42. Shutter 44 is operated, for example, at a one cycle per second rate by drive/shutter motor 66 to which it is mechanically coupled. Passing through aperture 42 the beam of light 41 is applied to a beam splitting mirror 45 which divides beam 41 into reflected beam 47 and transmitted beam 46. Beam 47 is reflected from mirror 48 and is then widened into a reference beam 47 by means of lenses 49 and 52. The beam is passed through a pinhole aperture 50 in a mask 51 located between lenses 49 and 52 to provide spatial filtering of the beam to eliminate unwanted fringes.

Information (or object) beam 46 is widened by means of lens 55 and lens 58. The beam is passed through a pinhole aperture 56 of a mask 57 located between lenses 55 and 58 to provide spatial filtering of the information beam.

Beam 46 is then applied to a diffusing glass 59 for introducing redundancy into information beam 46. Redundancy of the information beam provides the same information to appear on many areas of the hologram, thereby minimizing effects of scratches, etc., on the hologram record.

It may be desirable to replace diffusing glass 59 with a bi-dimensional phase grating. The use of a bi-dimensional phase grating eliminates the presence of unwanted speckle noise in the reproduced image of the hologram, which speckle noise is present when a small size hologram is recorded with a diffused light information beam. A bi-dimensional phase grating and the advantages thereof are more fully described in a copending application, Ser. No. 662,822 entitled Redundant Speckle-Free Hologram Recording Apparatus, filed on Aug. 23, 1967, by Hendrik J. Gerritsen and William J. Hannan. The bi-dimensional grating is designed to yield the maximum possible hologram redundancy consistent with preventing spurious grating lines caused by beats between the bi-dimensional grating and the pattern of color encoding stripes present on the black and white encoded film 60 from appearing in the reconstructed image. In this regard it is desirable to use a form of color encoding in which the code stripes run in only one direction. This way since there is no possibility of beats between the code stripes and an orthogonal set of grating lines, redundancy can be maximized.

Another reason for using one-directional color encoding stripes is to eliminate the need for accurate frame-to-frame registration in two directions. In this regard the color encoding filter described in previously mentioned U.S. Pat. No. 2,733,291 is ideal.

Redundant information beam 46 leaving diffusing glass 59 is applied to a color encoded black and white film 60. Film 60 is supplied from a reel 61 and is taken up on a reel 62. The drive mechanism for moving encoded film 60 is coupled to drive/shutter motor 66. Color encoded film 60 is of a type produced by the apparatus described in conjunction with FIGS. 2 and 3. The information beam 46 passing through encoded film 60 is applied to a lens 63 which has its focal point in the plane of film 60 therefore, the rays of light of beam 46 emitted from lens 63 are substantially parallel. This arrangement of lens 63 enables production of a Fraunhofer hologram. A phase hologram of the Fraunhofer type is advantageous in that replicas of the hologram may be played back with the replica in motion and still result in an image which does not move as the hologram replica is moved across the playback light beam.

Information beam 46 and reference beam 47 are directed through an aperture 53 in a mask 54 to form a hologram on recording medium 64. As previously described, information beam 46 and reference beam 47 form an interference pattern in accordance with the information contained in a frame of color encoded film 60. This interference pattern is recorded on recording medium 64. In this embodiment recording medium 64 is in a disc form such as described in the above-mentioned Gerritsen et al copending application.

The disc 64 is rotated and moved vertically simultaneously by a mechanism 65 coupled to drive/shutter motor 66 such that the single color encoded holograms of each frame of film 60 are recorded in a spiral on recording disc 64. Thus, disc 64 after processing has recorded on it in relief pattern form holograms representative of the color encoded images of film 60. As described by Gerritsen et al., a metal master may be made from recording disc 64 and utilized for producing replicas of the original disc 64.

Figure 5:
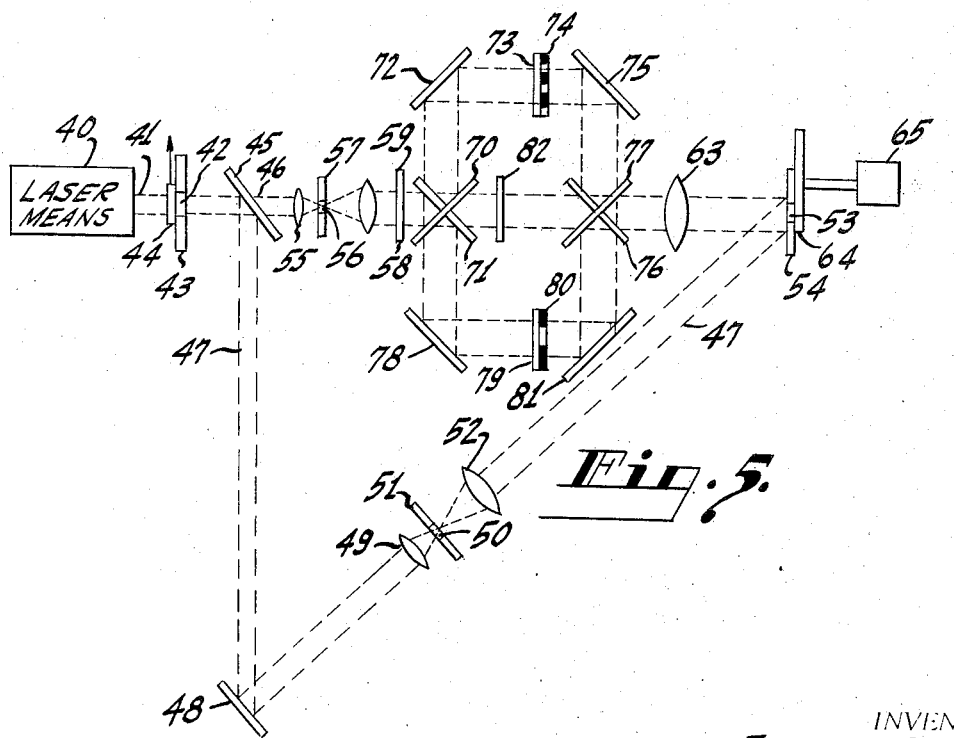
FIG. 5 is a functional diagram of apparatus for making color encoded hologram records of color separation negatives.

FIG. 5 is a diagram showing apparatus for making color encoded hologram records of color separation negatives. A color separation negative may be prepared by illuminating a color transparency through a filter of a particular color for which the negative is to be made and exposing a black and white film with the filtered light. Those items of FIG. 5 corresponding to similar items described in conjunction with FIG. 4 and performing similar functions are designated by the same numbers as in FIG. 4.

A beam 41 of spatially coherent monochromatic light from laser means 40 is directed through aperture 42 of mask 43 when shutter 44 is moved away from the aperture. Beam 41 is split by mirror 45 into a beam 47 which is reflected by mirror 48 through beam widening lenses 49 and 52 and beam control aperture 50 of mask 51 which spatially filters the beam, eliminating unwanted fringes. Beam 47, leaving lens 52, is the reference beam for forming a hologram as it passes through aperture 53 of mask 54 and reaches recording medium 64.

A portion of beam 41 is passed by mirror 45 for forming an information or object beam 46. Beam 46 is widened by lenses 55 and 58 of its fringes are controlled by aperture 56 of mask 57. Information beam 46 is directed through glass diffusor 59 for introducing redundancy into the beam. As described in conjunction with FIG. 4, a bi-dimensional phase grating may be used in place of glass diffusor 59 for reducing unwanted speckle noise in the hologram. The information beam 46 is split into three paths by mirrors 70 and 71. Mirror 70 directs a portion of the beam to a mirror 72. Mirror 72 directs the beam through a red color separation negative 73. A grating structure 74 is disposed adjacent the color separation negative. The grating may comprise a pattern of opaque and transparent strips such that the light beam passing through the grating is modulated by the information contained on the color separation negative 73. The information beam, containing red representative information, is reflected from a mirror 75 and a mirror 76 to a lens 63.

Mirror 71 reflects a portion of beam 46 to a mirror 78 which reflects that portion of the information beam through a blue color separation negative 79 and a grating structure 80 disposed adjacent the color separation negative. Grating structure 80 has a different line density than grating structure 74 so that the blue modulated information has a different spatial frequency and is thereby separated from the red. The blue information beam, containing modulation corresponding to the information contained in the blue color separation negative, is reflected from a mirror 81 and a mirror 77 to lens 63.

A third portion of information beam 46 is transmitted through mirrors 70 and 71 and through green color separation negative 82. It is not necessary that a grating structure be used with the green color separation negative since the red and blue information can be extracted on the basis of their respective spatial frequencies and the green information will be the remainder. The green information modulated beam is transmitted through mirrors 76 and 77 to lens 63.

Impinging on lens 63 are the red, blue and green information beam portions. Lens 63 is disposed a distance equal to its focal length away from the respective red, blue and green color separation negatives 73, 79 and 82. Therefore, the light rays leaving lens 63 are substantially parallel and form a Fraunhofer hologram as the interference pattern between the information beam 46 and reference beam 47 is established. This interference pattern, which is a phase hologram containing the encoded color information, is recorded on the recording disc 69 as described in the Gerritsen et al copending application.

In the embodiment shown in FIG. 5 it is not necessary to first separately encode the colors of a transparency on black and white film. This arrangement is advantageous in that the black and white film has a nonlinear characteristic when exposed to varying intensity light which limits the dynamic range of the film and thereby adds an undesirable nonlinearity to a system in which nonlinearities should be minimized. It is necessary to make color separation negatives, but this is easily accomplished and in the situation in which the hologram record is to be used to make many replicas, the additional cost is small when averaged over the cost of the replicas. It is to be understood that it is not necessary to split information beam 46 into three paths to simultaneously illuminate all three color separation negatives, but that a single information beam path may be used and the individual color separation negatives and their associated gratings may be separately disposed in the beam path.

FIG. 6 is a functional block diagram of apparatus for producing color and brightness representative signals from a replica of a color encoded hologram record. A source of spatially coherent monochromatic light obtained from laser means 85 is directed in a beam 86 through a replica of the color encoded hologram produced by the apparatus shown in FIGS. 2-5. The disc replica 87 is rotated and moved vertically by a mechanism 88 so that the successive holograms on disc replica 87 are moved into the playback beam 86. Beam 86 is directed at an angle to the plane of disc hologram replica 87 so that upon reaching replica 87, a first order beam 86a, produced by diffraction of beam 86 by hologram replica 87, is directed to an imaging lens 89. Beam 86a contains the color encoded information and lens 89 focusses this information onto a photosensitive electrode 90 of an image pickup tube 91. Disc replica 87, being a replica of the reduncant Fraunhofer type phase hologram recorded by the apparatus previously described, may be moved at a continuous speed by mechanism 88 without any distortion of the image formed at the photosensitive electrode 90 of image pickup tube 91. Thus, undesired variations in the speed of disc replica 87 will not result in an unsatisfactory image being formed at photosensitive electrode 90. Further, the redundant hologram replica may be played at any speed, forward or reverse, since the disc speed need not by synchronized with the scanning intervals of the image pickup tube.

The image formed at photosensitive electrode 90 will be a replica of the image contained on the black and white encoded film or on the color separation negatives with the superimposed gratings previously described. As described, the encoded information is in the form of two color modulated carrier waves and their sidebands and a luminance or brightness signal contained within a band of frequencies different then the frequency bands utilized for the color signals. Thus, this composite signal is obtained at an output terminal 92 of image pickup tube 91 as the electron beam scans the photosensitive electrode 90.

The composite signal obtained from terminal 92 is applied to a low pass filter 93 for separating the brightness components from the composite signal. This luminance signal having a bandwidth of 3 MHz is obtained from an output terminal 94 of low pass filter 93.

The composite signal is also coupled to a bandpass filter 95 which separates the carrier signal modulated by blue representative signals from the composite signal. The blue modulated carrier wave is detected by an amplitude detector 96 and coupled to an input terminal of subtractor 97. The composite signal is also coupled to a low pass filter 98, at the output of which is obtained a luminance or brightness signal having a 500 KHz bandwidth, equal in bandwidth to the detected color signals. This narrow band luminance signal is coupled to another input terminal of subtractor 97 in which it is subtracted from the blue representative signal for producing a B-Y color difference signal.

The composite signal obtained at terminal 92 is also coupled to a bandpass filter 100. Bandpass filter 100 separates the red color modulated carrier wave and its sidebands from the composite signal. This wave is coupled to an amplitude detector 101 and the red color representative wave obtained from detector 101 is coupled to an input terminal of subtractor 102. Also coupled to an input terminal of subtractor 102 is the narrow band luminance signal obtained from low pass filter 98. This narrow band luminance signal is subtracted from the detected red color representative signal for producing an R-Y color difference signal which is obtained from an output terminal 103 of subtractor 102.

The brightness signal and B-Y and R-Y color difference signals may be applied to corresponding video amplifiers in a color television receiver for reproducing on a color picture tube an image corresponding to the scene encoded on the hologram record.

What has been described is a system and method for producing and playing back color encoded hologram records. By utilizing color encoding techniques in making the hologram records it is possible to make a hologram record containing full color and brightness information of a scene, as represented by color transparencies or color representative video signals, utilizing a single source of laser light in the hologram recording and playback apparatus. This arrangement is thus simpler and less costly than previously known arrangements requiring separate laser light sources for recording and playing back the separate colors, each of which were recorded in separate holograms. Also, by utilizing the method and apparatus disclosed by applicant it is possible to derive full color and brightness information from the playback unit utilizing only a single image pickup device such as a vidicon since the encoded color and brightness information imaged onto the vidicon may be separated electrically with relatively simple electrical circuitry.

What is claimed is:

1. A system for producing color encoded Fraunhofer hologram records, comprising:
    means for encoding information representative of the color of a scene onto a first record such that said color information is contained as monochromatic intensity variations; and
    hologram producing means including a single source of spatially coherent monochromatic light directed for forming an object and a reference beam, said object beam being directed to said first record and from said first record for making a second record comprising a color encoded phase hologram of the Fraunhofer type containing said encoded color information in a single hologram contained on said hologram record.

2. A system for producing color encoded hologram records according to claim 1 wherein means are included for encoding brightness information of said scene on said hologram record.

3. A system for producing color encoded hologram records, comprising:
    means including a striped spatial color encoding filter for encoding colored light from a color transparency onto a black and white film for forming an encoded monochromatic image thereon;
    means providing a source of coherent light;
    a light responsive recording medium;
    means for directing light from said coherent light source through said color encoded black and white film to said recording medium;
    lens means disposed between said black and white film and said photosensitive medium at a distance substantially equal to its focal length from said film; and
    means for directing light from said coherent light source through another path for forming a Fraunhofer hologram of said color encoded black and white film image on said recording medium.

4. A system for producing color encoded hologram records, comprising:
    a source of color and brightness signals representative of the color and brightness of a scene wherein said brightness signal is contained within a first range of frequencies and said color signals are contained within a second range of frequencies;
    black and white film recording means responsive to said source of color and brightness signals for producing a black and white color encoded film recording;
    means providing a source of coherent light;
    a light responsive recording medium;
    means for directing light from said coherent light source through said color encoded black and white film to said recording medium;
    lens means disposed between said black and white film and said light responsive recording medium at a distance substantially equal to its focal length from said film; and
    means for directing light from said coherent light source through another path for forming a Fraunhofer phase hologram of said color encoded black and white film image on said recording medium.

5. A system for producing color encoded hologram records, comprising:
    a source of spatially coherent monochromatic light;
    a recording medium responsive to said spatially coherent monochromatic light;
    means for directing said spatially coherent monochromatic light along a first path including at least one color separation negative disposed adjacent a grating means to said recording medium whereby said light is modulated by the information contained in said color separation negative and encoded by said grating means said means for directing light along a first path including lens means disposed between said at least one color separation negative and said recording medium at a distance substantially equal to its focal length from said at least one color separation negative; and
    means for directing said spatially coherent monochromatic light through a second path to create an interference pattern with said modulated light from said first path, said interference pattern forming a color encoded Fraunhofer hologram which is recorded in said recording medium.

6. A system for producing color hologram records according to claim 5 wherein said first path includes:
   means for splitting said spatially coherent monochromatic light into a plurality of beams;
   means directing each of said plurality of beams through a separate color separation negative representative of a color of a scene;
   grating means disposed adjacent said color separation negatives for encoding said light passing through said negatives; and
   means for combining said plurality of beams after said beams have been modulated by the information contained in said color separation negatives and encoded by said grating means.

7. A system for producing color encoded hologram records according to claim 6, including:
   light splitting means for splitting said light into three beams;
   said first, second and third of said beams being directed through a different one of three color separation negatives, each negative containing information representative of a different of three colors of a scene; and
   grating means having different line densities disposed adjacent two of said three color separation negatives for spatially encoding light representative of two of said three colors.

8. A method of making a color encoded Fraunhofer hologram record, comprising:
   spatially encoding information representative of the color of a scene;
   directing said encoded information as modulation of a first beam of spatially coherent monochromatic light along a first path to a recording medium responsive to said light;
   directing a beam of said unmodulated spatially coherent monochromatic light along a second path for forming an interference pattern with said modulated beam of spatially coherent monochromatic light whereby said interference pattern is recorded on said recording medium as a Fraunhofer hologram containing said encoded color information.

9. A method of making a color encoded Fraunhofer hologram recording, comprising:
   combining a brightness representative signal contained within a first frequency range with color representative signals contained within a second frequency range for forming a composite signal continuously representative of both the color and brightness of a scene;
   coupling said composite signal to means for recording said composite signal on black and white motion picture film for forming color encoded images of said scene;
   making a Fraunhofer hologram of said color encoded film images by directing a first light component from a spatially coherent monochromatic light source through said color encoded film through a lens disposed a distance substantially equal to its focal length from said film to impinge on a recording medium at a first predetermined angle and directing a second light component to impinge on said recording medium at a second predetermined angle for producing an interference pattern between said first and second light components for producing a Fraunhofer hologram relief pattern on said recording medium representative of the color and brightness of said scene.

10. A method of constructing a color visual information containing hologram, comprising the steps of:
    separating the color visual information into a plurality of components including luminance and color component signals,
    recording said luminance and color component signals onto a black-and-white photosensitive material in a manner that each component is separably retrievable therefrom, thereby to form a color coded transparency, and
    constructing a hologram of said coded transparency with monochromatic coherent light.

11. A method of constructing a hologram containing one frame of color visual information, comprising the steps of:
    separating said color visual information into its narrow bandwidth color components,
    recording said components on a common area of a black-and-white photosensitive material in a manner that a replica of said color visual information may be reconstructed therefrom, thereby to form a color coded transparency, and
    constructing a single hologram of said color coded transparency with coherent light.

* * * * *